United States Patent
Han et al.

(10) Patent No.: US 9,525,505 B2
(45) Date of Patent: Dec. 20, 2016

(54) METHOD AND APPARATUS FOR ACQUIRING INTERNAL FIBER CONNECTION RELATIONSHIP IN RECONFIGURABLE OPTICAL ADD/DROP MULTIPLEXER

(71) Applicant: Huawei Technologies Co., Ltd., Shenzhen (CN)

(72) Inventors: Jianrui Han, Shenzhen (CN); Sen Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 14/616,372

(22) Filed: Feb. 6, 2015

(65) Prior Publication Data

US 2015/0155964 A1    Jun. 4, 2015

Related U.S. Application Data

(63) Continuation of application No. PCT/CN2012/079783, filed on Aug. 7, 2012.

(51) Int. Cl.
   *H04J 14/02*    (2006.01)
   *H04Q 11/00*    (2006.01)

(52) U.S. Cl.
   CPC ....... *H04J 14/0212* (2013.01); *H04Q 11/0005* (2013.01); *H04Q 2011/0016* (2013.01)

(58) Field of Classification Search
   CPC .. H04J 14/02–14/0227; H04Q 11/00–11/0005; H04Q 11/0062; H04Q 11/0066; H04Q 11/0067; H04Q 2011/0016–2011/0032

USPC ...................................................... 398/45–57
See application file for complete search history.

(56) References Cited

U.S. PATENT DOCUMENTS

| 5,774,245 A | 6/1998 | Baker |
| 6,559,984 B1 | 5/2003 | Lee et al. |
| 8,705,959 B2 * | 4/2014 | Takita ............... H04L 45/38 370/252 |
| 8,818,191 B2 * | 8/2014 | Sakamoto ....... H04J 14/0204 398/173 |

(Continued)

FOREIGN PATENT DOCUMENTS

| CN | 1747466 A1 | 3/2006 |
| CN | 101621722 A | 1/2010 |

(Continued)

*Primary Examiner* — Li Liu
(74) *Attorney, Agent, or Firm* — Slater Matsil, LLP

(57) ABSTRACT

A method of the present invention includes: acquiring logic optical propagation paths between an egress port of a wavelength selective switch at a receive end and an ingress port of a wavelength selective switch at a transmit end; separately configuring a different wavelength cross connection for the acquired logic optical propagation paths; connecting a communication light source to an ingress port of the wavelength selective switch at the receive end; collecting a wavelength of an optical signal on an egress port of the wavelength selective switch at the transmit end; determining a logic optical propagation path corresponding to the collected wavelength of optical signal; and determining a fiber connection relationship between the egress port of the wavelength selective switch at the receive end and the ingress port of the wavelength selective switch at the transmit end.

14 Claims, 6 Drawing Sheets

(56) References Cited

U.S. PATENT DOCUMENTS

| | | | |
|---|---|---|---|
| 8,977,129 B2* | 3/2015 | Coroy | H04J 14/021 398/45 |
| 9,246,580 B2* | 1/2016 | Yamashita | H04B 10/0771 |
| 2004/0208551 A1* | 10/2004 | Weverka | H04J 14/0204 398/50 |
| 2004/0264847 A1* | 12/2004 | Koh | G02B 6/3502 385/22 |
| 2009/0041457 A1* | 2/2009 | Maki | H04J 14/0204 398/45 |
| 2009/0142057 A1* | 6/2009 | Nakano | H04J 14/0206 398/50 |
| 2009/0232497 A1* | 9/2009 | Archambault | H04J 14/0206 398/50 |
| 2010/0221004 A1* | 9/2010 | Haslam | H04J 14/0201 398/49 |
| 2012/0033969 A1* | 2/2012 | Sakauchi | G02B 6/2932 398/48 |
| 2012/0141126 A1 | 6/2012 | Feng | |
| 2012/0224851 A1* | 9/2012 | Takara | H04B 10/0793 398/45 |
| 2013/0028594 A1 | 1/2013 | Li | |
| 2013/0243373 A1* | 9/2013 | Taketomi | G02B 6/3588 385/20 |

FOREIGN PATENT DOCUMENTS

| | | | | |
|---|---|---|---|---|
| CN | 101640822 A | | 2/2010 | |
| CN | 101834663 A | | 9/2010 | |
| CN | 101895340 A | | 11/2010 | |
| CN | 102130721 | * | 7/2011 | H04B 10/08 |
| CN | 102130721 A | | 7/2011 | |
| CN | 102495918 A | | 6/2012 | |

\* cited by examiner

METHOD AND APPARATUS FOR ACQUIRING INTERNAL FIBER CONNECTION RELATIONSHIP IN RECONFIGURABLE OPTICAL ADD/DROP MULTIPLEXER

This application is a continuation of International Application No. PCT/CN2012/079783, filed on Aug. 7, 2012, which is hereby incorporated by reference in its entirety.

TECHNICAL FIELD

The present invention relates to the field of optical processing technologies, and in particular, to a method and an apparatus for acquiring an internal fiber connection relationship in a reconfigurable optical add/drop multiplexer.

BACKGROUND

Currently, a DWDM dense wavelength division multiplexing system is the most common optical layer networking technology, and may implement a capability of transmitting dozens of waves or even hundreds of waves by using a multiplexer/demultiplexer. With increasing requirements of IP-based and packetized service networks, a wavelength division network also gradually evolves from a conventional point-to-point line system to a Mesh system that can implement intelligent wavelength scheduling. A reconfigurable optical add/drop multiplexer (ROADM) is a main enabling technology that implements optical layer reconfiguration, and may implement add/drop of an optical channel on a node and cross scheduling on a pass-through wavelength between optical channels at a wavelength level. At present, a WSS (wavelength selective switch)-based ROADM may provide a wavelength granularity channel in all directions and may reconfigure all straight-through ports and add/drop ports remotely, is applicable to implementation of multi-directional interconnection between rings and construction of a Mesh network, and gradually becomes a preferred technology of a ROADM above four dimensions.

In the WSS-based ROADM, service scheduling in two different directions (that is, a service receiving direction and a service sending direction) is implemented by using a pair of WSSs. In each WSS, a port is disposed and used to add or drop a local signal, and N ports are further disposed and used for network cross interconnection among N ROADM modules, so as to implement service scheduling of N degrees of freedom. A greater N leads to more connection relationships between the ports. To accurately perform service scheduling, it is necessary to accurately know that there is an optical fiber connection relationship between which pair of ports on which pair of WSSs. Any inconsistency between an actual connection of an optical fiber and a planned connection relationship causes invalid service scheduling.

In the prior art, an optical fiber connection relationship needs to be manually created by a user, which leads to a long working time and is error-prone.

SUMMARY

Embodiments of the present invention provide a method and an apparatus for acquiring an internal fiber connection relationship in a reconfigurable optical add/drop multiplexer, which may accurately and efficiently acquire an internal fiber connection relationship in a reconfigurable optical add/drop multiplexer.

To achieve the foregoing objective, the following technical solutions are used in the embodiments of the present invention.

A method for acquiring an internal fiber connection relationship in a reconfigurable optical add/drop multiplexer, including acquiring logic optical propagation paths between an egress port of a wavelength selective switch at a receive end and an ingress port of a wavelength selective switch at a transmit end; separately configuring a different wavelength cross connection for the acquired logic optical propagation paths; connecting a communication light source to an ingress port of the wavelength selective switch at the receive end; collecting a wavelength of an optical signal on an egress port of the wavelength selective switch at the transmit end; determining, according to the collected wavelength of the optical signal, a logic optical propagation path corresponding to the collected wavelength of the optical signal; and determining a fiber connection relationship between the egress port of the wavelength selective switch at the receive end and the ingress port of the wavelength selective switch at the transmit end according to the logic optical propagation path corresponding to the collected wavelength of the optical signal, and storing the fiber connection relationship.

An apparatus for acquiring an internal fiber connection relationship in a reconfigurable optical add/drop multiplexer, including an acquiring unit, configured to acquire logic optical propagation paths between an egress port of a wavelength selective switch at a receive end and an ingress port of a wavelength selective switch at a transmit end; a configuration unit, configured to separately configure a different wavelength cross connection for the logic optical propagation paths acquired by the acquiring unit; a light source connecting unit, configured to connect a communication light source to an ingress port of the wavelength selective switch at the receive end; a collecting unit, configured to collect a wavelength of an optical signal on an egress port of the wavelength selective switch at the transmit end; a determining unit, configured to determine, according to the wavelength of the optical signal collected by the collecting unit, a logic optical propagation path corresponding to the collected wavelength of the optical signal, where the determining unit is configured to determine a fiber connection relationship between the egress port of the wavelength selective switch at the receive end and the ingress port of the wavelength selective switch at the transmit end according to the logic optical propagation path corresponding to the collected wavelength of the optical signal; and a storage unit, configured to store the fiber connection relationship.

According to a method and an apparatus for acquiring an internal fiber connection relationship in a reconfigurable optical add/drop multiplexer provided in the embodiments of the present invention, optical propagation paths from an ingress port of a wavelength selective switch at a receive end to an egress port of a wavelength selective switch at a transmit end are first traversed, then a different wavelength is set for each optical propagation path, an optical signal on the egress port of the wavelength selective switch at the transmit end is collected to determine a wavelength of the optical signal from the ingress port of the wavelength selective switch at the receive end to the egress port of the wavelength selective switch at the transmit end, and a fiber connection relationship between an egress port of the wavelength selective switch at the receive end and an ingress port of the wavelength selective switch at the transmit end is determined by using the collected wavelength of the optical signal, thereby avoiding a complex manual operation and reducing a manual workload, which may accurately and efficiently acquire an internal fiber connection relationship in a reconfigurable optical add/drop multiplexer.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
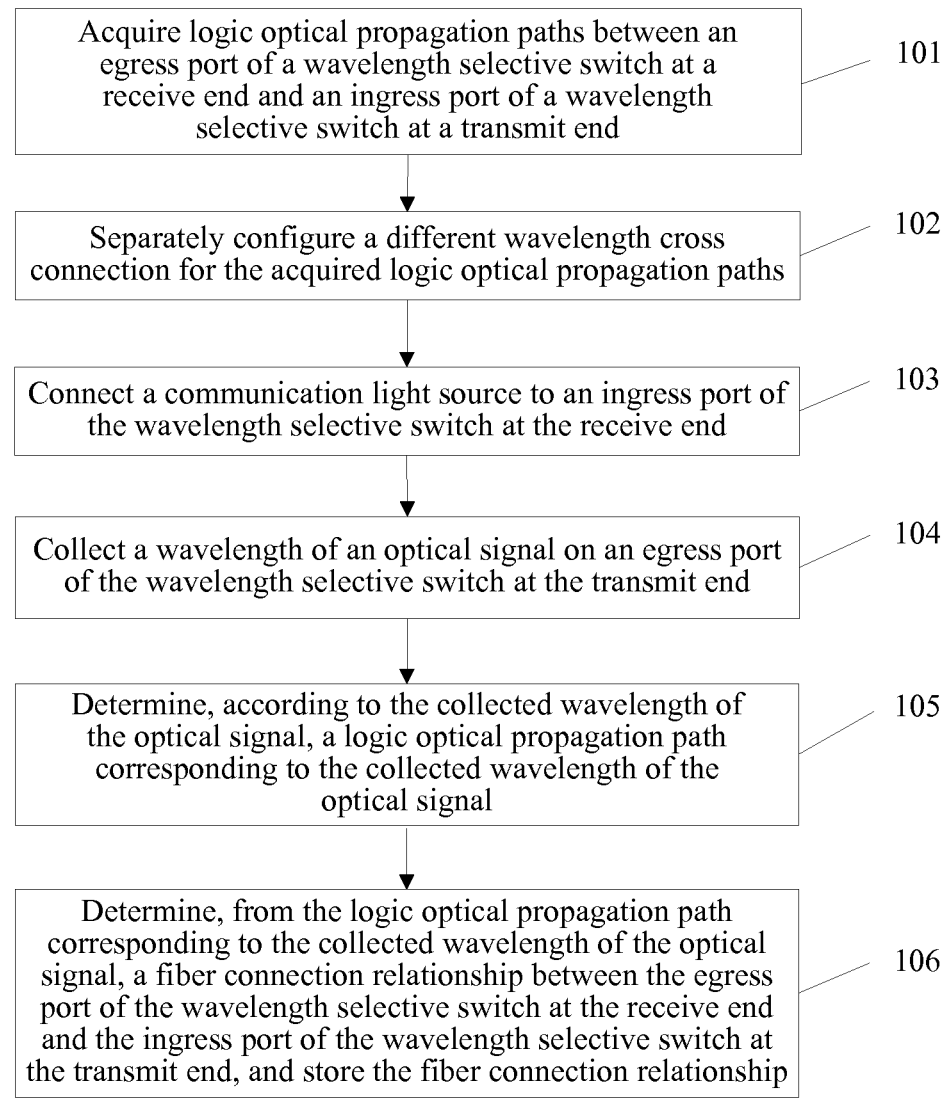
FIG. 1 is a flowchart of a method for acquiring an internal fiber connection relationship in a reconfigurable optical add/drop multiplexer according to Embodiment 1 of the present invention.

An embodiment of the present invention provides a method for acquiring an internal fiber connection relationship in a reconfigurable optical add/drop multiplexer. As shown in FIG. 1, the method includes the following steps.

101. Acquire logic optical propagation paths between an egress port of a wavelength selective switch at a receive end and an ingress port of a wavelength selective switch at a transmit end.

The logic optical propagation paths are paths where an optical signal successively passes through an ingress port of the wavelength selective switch at the receive end, an egress port of the wavelength selective switch at the receive end, an ingress port of the wavelength selective switch at the transmit end, and an egress port of the wavelength selective switch at the transmit end. The logic optical propagation paths are virtual optical propagation paths, which are paths that an optical signal may pass through in a transmission process.

102. Separately configure a different wavelength cross connection for the acquired logic optical propagation paths.

A mapping relationship exists between a wavelength cross connection configuration and an optical propagation path, that is, each optical propagation path only allows an optical signal with one wavelength to pass through.

It should be noted that the number and variety of configurable wavelengths depend on a capacity of a ROADM system.

103. Connect a communication light source to an ingress port of the wavelength selective switch at the receive end.

The communication light source may be a noise light source generated by a working pumping source and may also be a man-made artificial light source.

104. Collect a wavelength of an optical signal on an egress port of the wavelength selective switch at the transmit end.

The collecting a wavelength of an optical signal on the egress port of the wavelength selective switch at the transmit end may be implemented by measurement using an optical power meter, and a specific implementation method is a well-known technology to a person skilled in the art, which is not described in detail in this embodiment of the present invention.

105. Determine, according to the collected wavelength of the optical signal, a logic optical propagation path corresponding to the collected wavelength of the optical signal.

106. Determine, from the logic optical propagation path corresponding to the collected wavelength of the optical signal, a fiber connection relationship between the egress port of the wavelength selective switch at the receive end and the ingress port of the wavelength selective switch at the transmit end, and store the fiber connection relationship.

According to the method for acquiring an internal fiber connection relationship in a reconfigurable optical add/drop multiplexer provided in the embodiment of the present invention, logic optical propagation paths from an ingress port of a wavelength selective switch at a receive end to an egress port of a wavelength selective switch at a transmit end are first acquired, then a different wavelength cross connection is set for each acquired optical propagation path, an optical signal on the egress port of the wavelength selective switch at the transmit end is collected to determine a wavelength of the optical signal from the ingress port of the wavelength selective switch at the receive end to the egress port of the wavelength selective switch at the transmit end, and a fiber connection relationship between an egress port of the wavelength selective switch at the receive end and an ingress port of the wavelength selective switch at the transmit end is determined by using the collected wavelength of the optical signal, thereby avoiding a complex manual operation and reducing a manual workload, which may accurately and efficiently acquire an internal fiber connection relationship in a reconfigurable optical add/drop multiplexer.

Embodiment 2

Figure 2:
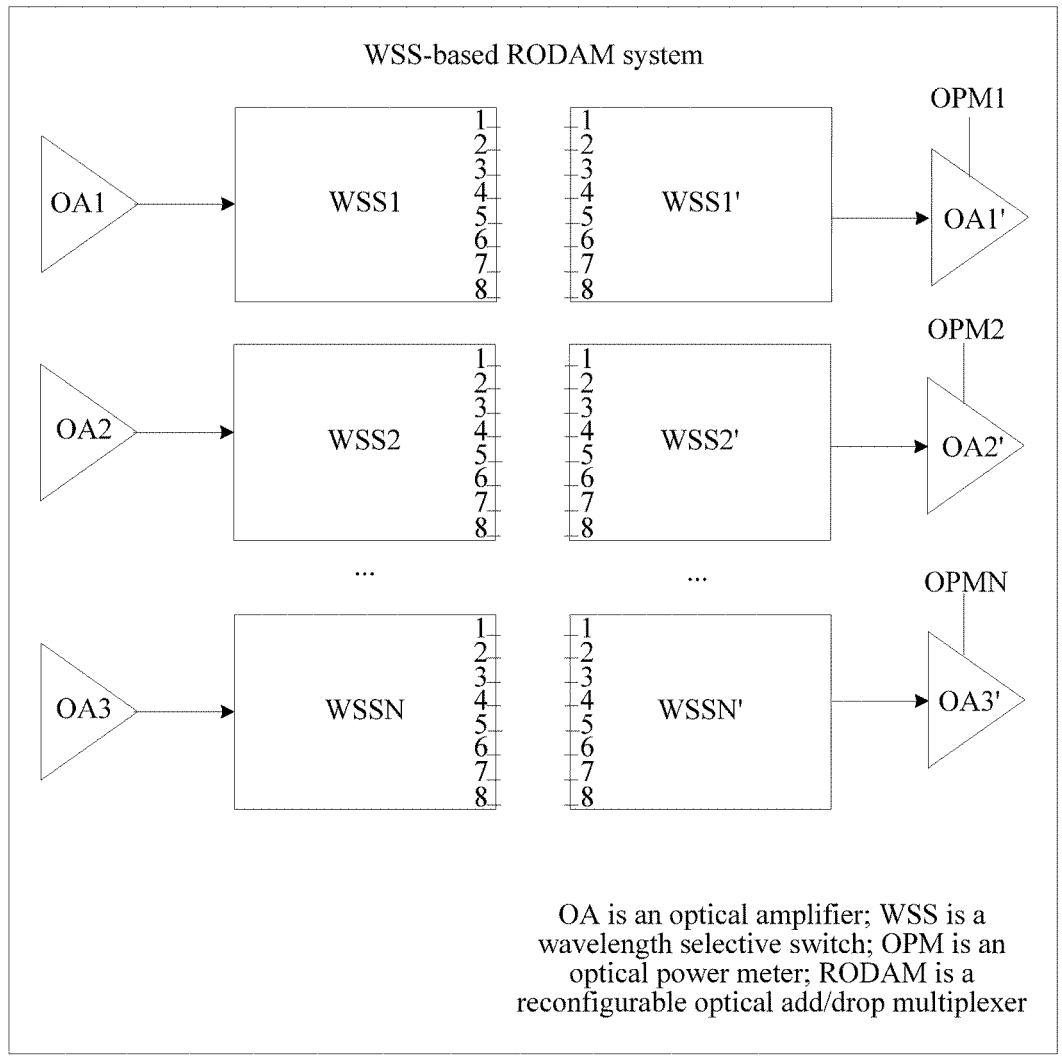
FIG. 2 is a flowchart of a method for acquiring an internal fiber connection relationship in a reconfigurable optical add/drop multiplexer according to Embodiment 2 of the present invention.

An embodiment of the present invention provides a method for acquiring an internal fiber connection relationship in a reconfigurable optical add/drop multiplexer, which may be applied to a WSS (wavelength selective switch)-based ROADM (reconfigurable optical add/drop multiplexer) system shown in FIG. 2. The system includes: a WSS, an OA (optical amplifier), and an OPM (optical power meter). The WSS may be classified, according to a configuration position, into a receive end WSS and a transmit end WSS that are configured to respectively receive and send an optical signal of a service. Each receive end WSS has an ingress port and a plurality of egress ports, and each transmit end WSS has an egress port and a plurality of ingress ports.

Figure 3:
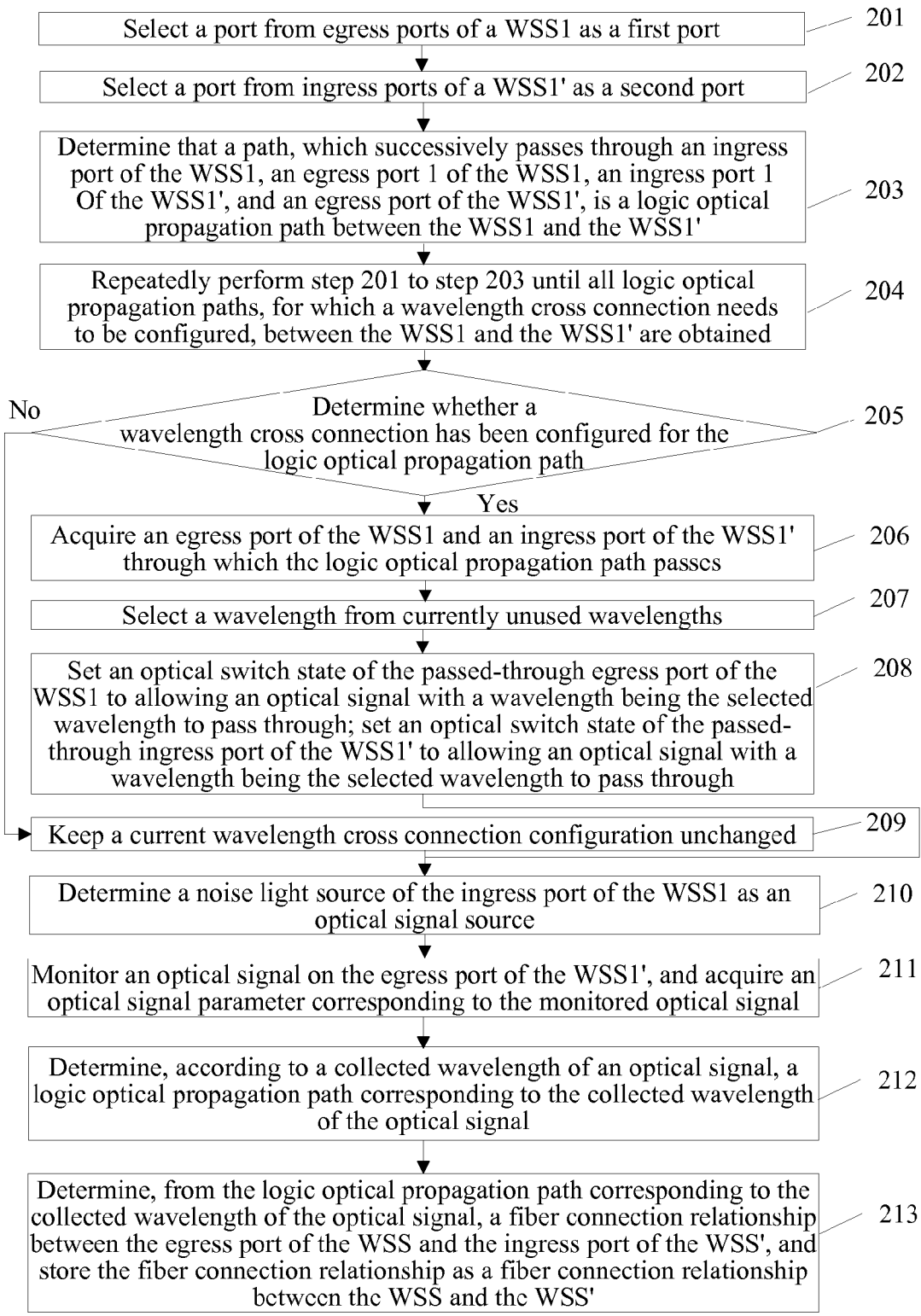
FIG. 3 is a composition block diagram of an apparatus for acquiring an internal fiber connection relationship in a reconfigurable optical add/drop multiplexer according to Embodiment 3 of the present invention.

On the basis of the foregoing WSS-based ROADM system structure, the method for acquiring an internal fiber connection relationship in a reconfigurable optical add/drop multiplexer provided in this embodiment of the present invention is described by using an example in which an fiber connection relationship between a WSS1 and a WSS1' is acquired. As shown in FIG. 3, the method includes the following steps.

201. Select a port from egress ports (numbered from 1 to n) of the WSS1 as a first port, for example, a port 1 may be selected as the first port.

202. Select a port from ingress ports (numbered from 1 to n) of the WSS1' as a second port, for example, a port 1 may be selected as the second port.

203. Determine that a path, which successively passes through an ingress port of the WSS1, an egress port 1 of the WSS1, an ingress port 1 of the WSS1', and an egress port of the WSS1', is a logic optical propagation path between the WSS1 and the WSS1'.

204. Repeatedly perform step 201 to step 203 until all logic optical propagation paths, for which a wavelength cross connection needs to be configured, between the WSS1 and the WSS1' are obtained.

It should be noted that, according to singleness of an optical fiber connection, one egress port of a receive end WSS can have a fiber connection relationship with only one ingress port of a transmit end WSS, and two ports with a fiber connection relationship cannot have a fiber connection relationship with another port. It can be learnt that when optical signals of services are passing through some ports in an optical selecting switch, there may be a specific number of optical propagation paths in all logic optical propagation paths acquired in step 204 cannot be implemented. Therefore, in order to simplify a detection process and provide efficiency, before step 201 is performed, the following steps may be further included: acquiring configuration information of a current service wavelength cross connection, where the configuration information of the current service wavelength cross connection is used to identify an egress port that is in a wavelength selective switch at the receive end and where an optical signal of a service is allowed to pass through and an ingress port that is in a wavelength selective switch at the transmit end and where an optical signal of a service is allowed to pass through; and determining, according to the configuration information of the current service wavelength cross connection, egress ports, which an optical signal of a service is not allowed to pass through, in the wavelength selective switch at the receive end, and ingress ports, which an optical signal of a service is not allowed to pass through, in the wavelength selective switch at the transmit end.

An execution process of step 201 may be specifically selecting an egress port from the egress ports, which an optical signal of a service is not allowed to pass through, in the wavelength selective switch at the receive end, as the first port.

An execution process of step 202 may be specifically selecting an ingress port from the ingress ports, which an optical signal of a service is not allowed to pass through, in the wavelength selective switch at the transmit end, as the second port.

205. Determine whether a wavelength cross connection has been configured for the logic optical propagation path; if it is determined that a wavelength cross connection has been configured for the logic optical propagation path, perform step 206; otherwise, perform step 209.

By using the logic optical propagation path acquired in step 203 as an example, the method for determining whether a wavelength cross connection has been configured for the logic optical propagation path specifically includes: determining whether a port 1 and a port 1' allow a same wavelength to pass through. If the port 1 and the port 1' allow a same wavelength to pass through, it is considered that a wavelength cross connection has been configured for the optical propagation path; if wavelengths that are allowed to pass through the port 1 and the port 1' does not include a same wavelength, it is considered that no wavelength cross connection is configured for the optical propagation path.

206. Acquire an egress port of the WSS1 and an ingress port of the WSS1' through which the logic optical propagation path passes.

207. Select a wavelength from currently unused wavelengths.

It should be noted that used wavelengths include a wavelength that is being used as a service wavelength and a wavelength that is configured for another optical propagation path. The unused wavelengths are remaining wavelengths obtained by subtracting used wavelengths from available wavelengths in the ROADM system.

208. Set an optical switch state of the passed-through egress port of the WSS1 to allowing an optical signal with a wavelength being the selected wavelength to pass through; set an optical switch state of the passed-through ingress port of the WSS1' to allowing an optical signal with a wavelength being the selected wavelength to pass through, and perform step 210.

209. Keep a current wavelength cross connection configuration unchanged, and perform step 210.

210. Connect a noise light source to the ingress port of the WSS1 as a communication light source.

It should be noted that if a service light source has been connected to the WSS1, a noise light source generated by a pumping source and the service light source are simultaneously connected to the WSS1 as the communication light source.

211. Monitor an optical signal on the egress port of the WSS1', and acquire a wavelength of an optical signal corresponding to the monitored optical signal.

212. Determine, according to the collected wavelength of the optical signal, an optical propagation path corresponding to the collected wavelength of the optical signal.

213. Determine, from the optical propagation path corresponding to the collected wavelength of the optical signal, a fiber connection relationship between the egress port of the WSS and the ingress port of the WSS', and store the fiber connection relationship.

If it is determined, according to the collected wavelength of the optical signal, that the optical propagation path corresponding to the collected wavelength of the optical signal is the optical propagation path acquired in step 203, it is considered that a fiber connection relationship exists between the port 1 and the port 1'.

It should be further noted that step 201 to step 213 describe only a method for acquiring the fiber connection relationship between the WSS1 and the WSS1', and a fiber connection relationship between other wavelength selective switches may also be acquired by using this method.

It should be noted that the forgoing step 201 to step 213 are only used to describe acquiring of a fiber connection relationship between a wavelength selective switch at a receive end and a wavelength selective switch at a transmit end, which is only one implementation manner of this embodiment of the present invention. A technical solution provided in this embodiment of the present invention may be further used to acquire a fiber connection relationship between one wavelength selective switch at the receive end and several wavelength selective switches at the transmit end or used to acquire a fiber connection relationship between several wavelength selective switches at the receive end and one wavelength selective switch at the transmit end, and may also be used to acquire a fiber connection relationship between one or more egress ports of a wavelength selective switch at the receive end and one or more ingress ports of a wavelength selective switch at the transmit end.

In addition, it should be noted that when no service is enabled and runs in the ROADM system, neither the wavelength selective switch at the receive end nor the wavelength selective switch at the transmit end carries an optical signal of a service or has any wavelength cross connection configuration. In this case, the logic optical propagation path between the wavelength selective switch at the receive end and the wavelength selective switch at the transmit end is all optical propagation paths formed by an entire combination between the egress ports of the wavelength selective switch at the receive end and the ingress ports of the wavelength selective switch at the transmit end, so that the following configuration method may be chosen to perform wavelength cross connection traversal configuration on all egress ports of the receive end WSS and all ingress ports of the transmit end WSS'. An example in which both the number of egress ports of the receive end WSS and the number of ingress ports of the transmit end WSS' are 8 is used as an example for specific description, and configuration content is as follows.

Cross connection configuration is performed by using 64 (8*8) wavelengths, so that each egress port of the WSS1 board allows eight wavelengths to pass through, and a specific configuration is as follows: Optical signals that are accessed from an In port and whose wavelengths are $\lambda 1$, $\lambda 2$, $\lambda 3$, $\lambda 4$, $\lambda 5$, $\lambda 6$, $\lambda 7$, and $\lambda 8$ are allowed to pass through a port 1 of the WSS1, optical signals that are accessed from the In port and whose wavelengths are $\lambda 8$, $\lambda 9$, $\lambda 10$, $\lambda 11$, $\lambda 12$, $\lambda 13$, $\lambda 14$, and $\lambda 15$ are allowed to pass through a port 2 of the WSS1, optical signals that are accessed from the In port and whose wavelengths are $\lambda 17$, $\lambda 18$, $\lambda 19$, $\lambda 20$, $\lambda 21$, $\lambda 22$, $\lambda 23$, and $\lambda 24$ are allowed to pass through a port 3 of the WSS1, and by analogy, the 64 wavelengths are configured for all egress ports of the WSS1.

Then, cross connection configuration is performed on the WSS1', and a specific configuration is as follows: A port 1' of the WSS1' allows optical signals whose wavelengths are $\lambda 1$, $\lambda 9$, $\lambda 17$, $\lambda 25$, $\lambda 33$, $\lambda 41$, $\lambda 49$, and $\lambda 57$ to pass through, a port 2' allows optical signals whose wavelengths are $\lambda 2$, $\lambda 10$, $\lambda 18$, $\lambda 26$, $\lambda 34$, $\lambda 42$, $\lambda 50$, and $\lambda 58$ to pass through, a port 3' allows optical signals whose wavelengths are $\lambda 3$, $\lambda 11$, $\lambda 19$, $\lambda 27$, $\lambda 35$, $\lambda 43$, $\lambda 51$, and $\lambda 59$ to pass through, and by analogy, the 64 wavelengths are configured for all ingress ports of the WSS1'.

A communication signal generated by a pumping source is connected to the ingress port of the WSS1, and the fiber connection relationship between the egress port of the WSS and the ingress port of the transmit end WSS' is determined according to a wavelength of an optical signal detected on the egress port of the WSS1'.

Further, if the number of wavelengths is less than 64, a fiber connection relationship between several egress ports of the WSS1 and several ingress ports of the WSS1' may be determined first. For example, a fiber connection relationship between 5 egress ports of the WSS1 and 5 egress ports of the WSS1' may be acquired by using 25 wavelengths, and then a fiber connection relationship between the remaining 3 egress ports of the WSS1 and the remaining 3 egress ports of the WSS1' is acquired by using 9 wavelengths.

According to the method for acquiring an internal fiber connection relationship in a reconfigurable optical add/drop multiplexer provided in the embodiment of the present invention, optical propagation paths from an ingress port of a wavelength selective switch at a receive end to an egress port of a wavelength selective switch at a transmit end are first acquired, then a different wavelength is set for each optical propagation path, an optical signal on the egress port of the wavelength selective switch at the transmit end is collected to determine a wavelength of the optical signal from the ingress port of the wavelength selective switch at the receive end to the egress port of the wavelength selective switch at the transmit end, and a fiber connection relationship between an egress port of the wavelength selective switch at the receive end and an ingress port of the wavelength selective switch at the transmit end is determined by using the collected wavelength of the optical signal, thereby avoiding a complex manual operation and reducing a manual workload, which may accurately and efficiently acquire an internal fiber connection relationship in a reconfigurable optical add/drop multiplexer.

Embodiment 3

Figure 4:
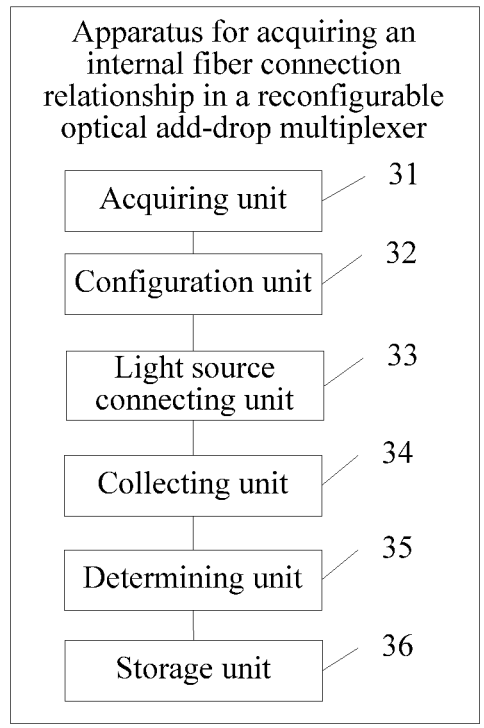
FIG. 4 is a composition block diagram of another apparatus for acquiring an internal fiber connection relationship in a reconfigurable optical add/drop multiplexer according to Embodiment 3 of the present invention.

An embodiment of the present invention provides an apparatus for acquiring an internal fiber connection relationship in a reconfigurable optical add/drop multiplexer. As shown in FIG. 4, the apparatus includes: an acquiring unit 31, a configuration unit 32, a light source connecting unit 33, a collecting unit 34, a determining unit 35, and a storage unit 36.

The acquiring unit 31 is configured to acquire logic optical propagation paths between an egress port of a wavelength selective switch at a receive end and an ingress port of a wavelength selective switch at a transmit end.

The configuration unit 32 is configured to separately configure a different wavelength cross connection for the logic optical propagation paths acquired by the acquiring unit 31.

The light source connecting unit 33 is configured to connect a communication light source to an ingress port of the wavelength selective switch at the receive end.

The collecting unit 34 is configured to collect an optical signal parameter on an egress port of the wavelength selective switch at the transmit end, where the optical signal parameter includes a wavelength of an optical signal.

The determining unit 35 is configured to determine, according to the wavelength of the optical signal collected by the collecting unit 34, a logic optical propagation path corresponding to the collected wavelength of the optical signal.

The determining unit 35 is configured to determine a fiber connection relationship between the egress port of the wavelength selective switch at the receive end and the ingress port of the wavelength selective switch at the transmit end according to the logic optical propagation path corresponding to the collected wavelength of the optical signal.

The storage unit 36 is configured to store the fiber connection relationship determined by the determining unit 35.

Figure 5:
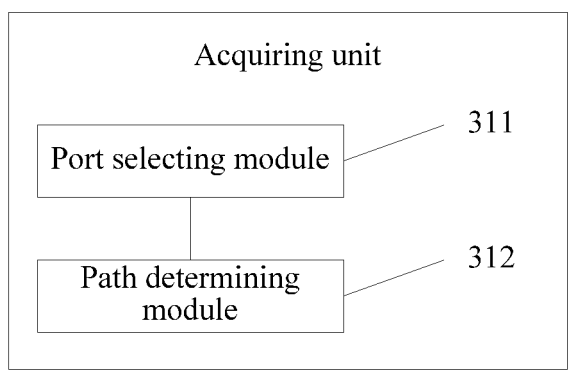
FIG. 5 is a composition block diagram of another apparatus for acquiring an internal fiber connection relationship in a reconfigurable optical add/drop multiplexer according to Embodiment 3 of the present invention.

Optionally, as shown in FIG. 5, the acquiring unit 31 includes a port selecting module 311 and a path determining module 312.

The port selecting module 311 is configured to determine that egress ports of the wavelength selective switch at the receive end are a first group of ports, and determine that ingress ports of the wavelength selective switch at the transmit end are a second group of ports.

The path determining module 312 is configured to determine that a path, which successively passes through the ingress port of the wavelength selective switch at the receive end, one port of the first group of ports, one port of the second group of ports, and the egress port of the wavelength selective switch at the sending end, is a logic optical propagation path between the wavelength selective switch at the receive end and the wavelength selective switch at the transmit end.

Figure 6:
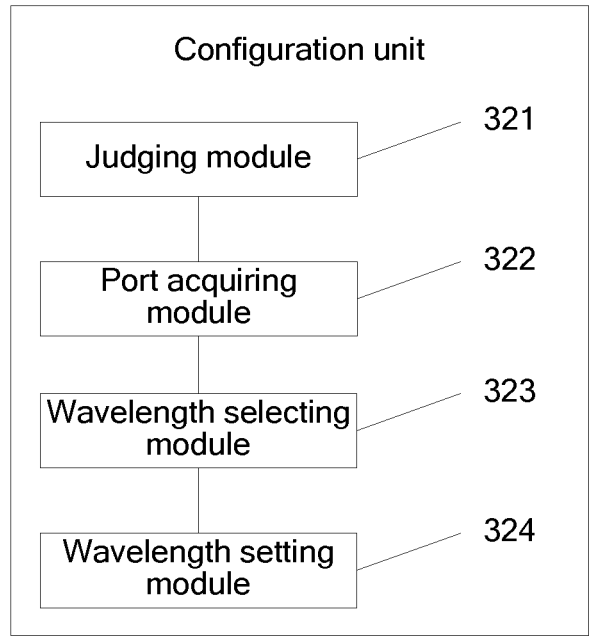
FIG. 6 is a composition block diagram of another apparatus for acquiring an internal fiber connection relationship in a reconfigurable optical add/drop multiplexer according to Embodiment 3 of the present invention.

Optionally, as shown in FIG. 6, the configuration unit 32 includes: a judging module 321, a port acquiring module 322, a wavelength selecting module 323, and a wavelength setting module 324.

The judging module 321 is configured to determine whether a wavelength cross connection has been configured for the logic optical propagation path.

The port acquiring module 322 is configured to, when the judging module 321 determines that no wavelength cross connection is configured for the logic optical propagation path, acquire an egress port of a wavelength selective switch at a receive end and an ingress port of a wavelength selective switch at a transmit end that the logic optical propagation path passes through.

The wavelength selecting module 323 is configured to select a wavelength from currently unused wavelengths.

The wavelength setting module 324 is configured to set an optical switch state of the passed-through egress port of the wavelength selective switch at the receive end to allowing an optical signal with a wavelength being the wavelength selected by the wavelength selecting module 323 to pass through.

The wavelength setting module 324 is configured to set an optical switch state of the passed-through ingress port of the wavelength selective switch at the transmit end to allowing an optical signal with a wavelength being the wavelength selected by the wavelength selecting module to pass through.

Optionally, the wavelength setting module 324 is further configured to keep a current wavelength cross connection configuration unchanged if the judging module determines that a wavelength cross connection has been configured for the logic optical propagation path.

Figure 7:
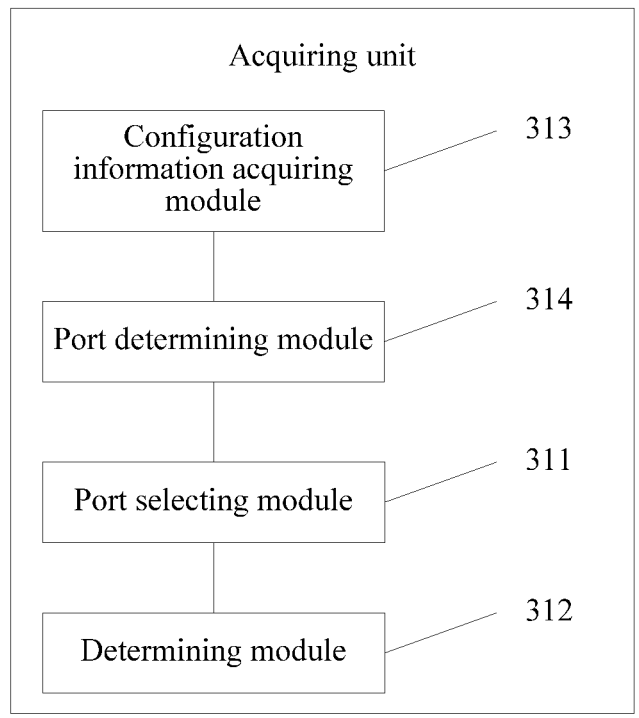
FIG. 7 is a composition block diagram of another apparatus for acquiring an internal fiber connection relationship in a reconfigurable optical add/drop multiplexer according to Embodiment 3 of the present invention.

Optionally, as shown in FIG. 7, the acquiring unit 31 further includes: a configuration information acquiring module 313 and a port determining module 314.

The configuration information acquiring module 313 is configured to acquire configuration information of a current service wavelength cross connection.

The port determining module 314 is configured to determine, according to the configuration information of the current service wavelength cross connection acquired by the configuration information acquiring module 313, egress ports, which an optical signal of a service is not allowed to pass through, in the wavelength selective switch at the receive end, and ingress ports, which an optical signal of a service is not allowed to pass through, in the wavelength selective switch at the transmit end.

The port selecting module 311 is specifically configured to select an egress port from the egress ports, which an optical signal of a service is not allowed to pass through, in the wavelength selective switch at the receive end, as a first port, and select an ingress port from the ingress ports, which an optical signal of a service is not allowed to pass through, in the wavelength selective switch at the transmit end, as a second port.

According to the apparatus for acquiring an internal fiber connection relationship in a reconfigurable optical add/drop multiplexer provided in the embodiment of the present invention, optical propagation paths from an ingress port of a wavelength selective switch at a receive end to an egress port of a wavelength selective switch at a transmit end are first acquired, then a different wavelength is set for each optical propagation path, an optical signal on the egress port of the wavelength selective switch at the transmit end is collected to determine a wavelength of the optical signal from the ingress port of the wavelength selective switch at the receive end to the egress port of the wavelength selective switch at the transmit end, and a fiber connection relationship between an egress port of the wavelength selective switch at the receive end and an ingress port of the wavelength selective switch at the transmit end is determined by using the collected wavelength of the optical signal, thereby avoiding a complex manual operation and reducing a manual workload, which may accurately and efficiently acquire an internal fiber connection relationship in a reconfigurable optical add/drop multiplexer.

Embodiment 4

Figure 8:
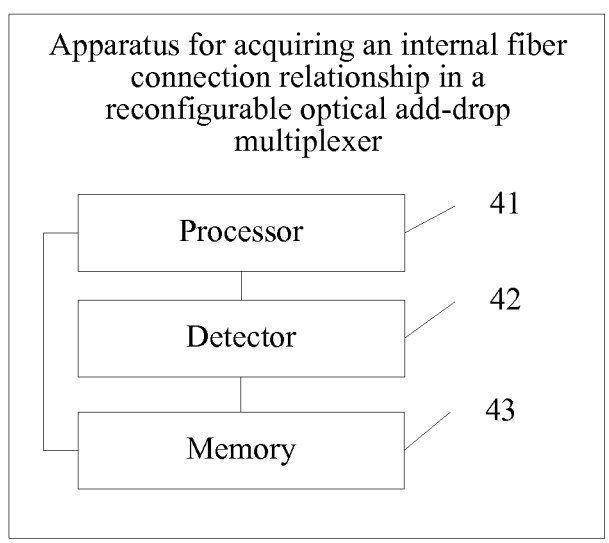
FIG. 8 is a composition block diagram of another apparatus for acquiring an internal fiber connection relationship in a reconfigurable optical add/drop multiplexer according to Embodiment 3 of the present invention.

An embodiment of the present invention provides an apparatus for acquiring an internal fiber connection relationship in a reconfigurable optical add/drop multiplexer. As shown in FIG. 8, the apparatus includes a processor 41, a detector 42, and a memory 43.

The processor 41 is configured to acquire logic optical propagation paths between an egress port of a wavelength selective switch at a receive end and an ingress port of a wavelength selective switch at a transmit end; separately configure a different wavelength cross connection for the acquired logic optical propagation paths; determine, according to a collected wavelength of an optical signal, a logic optical propagation path corresponding to the collected wavelength of the optical signal; and determine, from the logic optical propagation path corresponding to the collected wavelength of the optical signal, a fiber connection relationship between the egress port of the wavelength selective switch at the receive end and the ingress port of the wavelength selective switch at the transmit end.

The detector 42 is configured to connect a communication light source to an ingress port of the wavelength selective switch at the receive end; and collect a wavelength of an optical signal on an egress port of the wavelength selective switch at the transmit end.

The memory 43 is configured to store the fiber connection relationship.

Optionally, the processor 41 is further configured to determine that egress ports of the wavelength selective switch at the receive end are a first group of ports and that ingress ports of the wavelength selective switch at the transmit end are a second group of ports, and determine that a path, which successively passes through the ingress port of the wavelength selective switch at the receive end, one port of the first group of ports, one port of the second group of ports, and the egress port of the wavelength selective switch at the sending end, is a logic optical propagation path between the wavelength selective switch at the receive end and the wavelength selective switch at the transmit end.

The memory 43 is further configured to store the logic optical propagation path.

Optionally, the processor 41 is further configured to determine whether a wavelength cross connection has been configured for the logic optical propagation path; if it is determined that no wavelength cross connection is configured for the logic optical propagation path, acquire an egress port of a wavelength selective switch at a receive end and an ingress port of a wavelength selective switch at a transmit end, where an optical propagation path with no wavelength cross connection configured passes through the egress port and the ingress port; select a wavelength from currently unused wavelengths; set an optical switch state of the passed-through egress port of the wavelength selective switch at the receive end to allowing an optical signal with a wavelength being the selected wavelength to pass through; and set an optical switch state of the passed-through ingress port of the wavelength selective switch at the transmit end to allowing an optical signal with a wavelength being the selected wavelength to pass through.

The memory 43 is further configured to store the currently unused wavelengths, the optical switch state of the currently passed-through egress port of the wavelength selective switch at the receive end, and the optical switch state of the currently passed-through ingress port of the wavelength selective switch at the transmit end.

Optionally, the processor 41 is further configured to keep a current wavelength cross connection configuration unchanged if it is determined that a wavelength cross connection has been configured for the logic optical propagation path.

The memory 43 is configured to store the current wavelength cross connection configuration.

Optionally, the processor 41 is further configured to acquire configuration information of a current service wavelength cross connection; determine, according to the configuration information of the current service wavelength cross connection, egress ports, which an optical signal of a service is not allowed to pass through, in the wavelength selective switch at the receive end, and ingress ports, which an optical signal of a service is not allowed to pass through, in the wavelength selective switch at the transmit end; select an egress port from the egress ports, which an optical signal of a service is not allowed to pass through, in the wavelength selective switch at the receive end, as a first port; and select an ingress port from the ingress ports, which an optical signal of a service is not allowed to pass through, in the wavelength selective switch at the transmit end, as a second port.

The memory 43 is further configured to store the configuration information of the current service wavelength cross connection.

According to the apparatus for acquiring an internal fiber connection relationship in a reconfigurable optical add/drop multiplexer provided in the embodiment of the present invention, optical propagation paths from an ingress port of a wavelength selective switch at a receive end to an egress port of a wavelength selective switch at a transmit end are first traversed, then a different wavelength is set for each optical propagation path, an optical signal on the egress port of the wavelength selective switch at the transmit end is collected to determine a wavelength of the optical signal from the ingress port of the wavelength selective switch at the receive end to the egress port of the wavelength selective switch at the transmit end, and a fiber connection relationship between an egress port of the wavelength selective switch at the receive end and an ingress port of the wavelength selective switch at the transmit end is determined by using the collected wavelength of the optical signal, thereby avoiding a complex manual operation and reducing a manual workload, which may accurately and efficiently acquire an internal fiber connection relationship in a reconfigurable optical add/drop multiplexer.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for acquiring an internal fiber connection relationship in a reconfigurable optical add/drop multiplexer, the method comprising:
   acquiring logic optical propagation paths between an egress port of a wavelength selective switch at a receive end and an ingress port of a wavelength selective switch at a transmit end, wherein the logic optical propagation paths are virtual optical propagation paths along which an optical signal may pass through in a transmission process;
   separately configuring a different wavelength cross connection for the acquired logic optical propagation paths;

connecting a communication light source to an ingress port of the wavelength selective switch at the receive end;
collecting a wavelength of an optical signal on an egress port of the wavelength selective switch at the transmit end;
determining, according to the collected wavelength of the optical signal, a logic optical propagation path corresponding to the collected wavelength of the optical signal; and
determining a fiber connection relationship between the egress port of the wavelength selective switch at the receive end and the ingress port of the wavelength selective switch at the transmit end according to the logic optical propagation path corresponding to the collected wavelength of the optical signal, and storing the fiber connection relationship; and
selecting an egress port of the wavelength selective switch at the receive end as a first port and selecting an ingress port of the wavelength selective switch at the transmit end as a second port; and
wherein acquiring the logic optical propagation paths comprises:
determining that egress ports of the wavelength selective switch at the receive end are a first group of ports;
determining that ingress ports of the wavelength selective switch at the transmit end are a second group of ports; and
determining that a path, which successively passes through the ingress port of the wavelength selective switch at the receive end, one port of the first group of ports, one port of the second group of ports, and the egress port of the wavelength selective switch at a sending end, is a logic optical propagation path between the wavelength selective switch at the receive end and the wavelength selective switch at the transmit end; and
wherein before selecting the egress port of the wavelength selective switch at the receive end as the first port and selecting the ingress port of the wavelength selective switch at the transmit end as the second port, the method further comprises:
acquiring configuration information of a current service wavelength cross connection; and
determining, according to the configuration information of the current service wavelength cross connection, egress ports, which an optical signal of a service is not allowed to pass through, in the wavelength selective switch at the receive end, and ingress ports, which an optical signal of a service is not allowed to pass through, in the wavelength selective switch at the transmit end.

2. The method according to claim 1, wherein selecting the egress port of the wavelength selective switch at the receive end as the first port comprises selecting an egress port from the egress ports, which an optical signal of a service is not allowed to pass through, in the wavelength selective switch at the receive end, as the first port; and
wherein selecting the ingress port of the wavelength selective switch at the transmit end as the second port comprises selecting an ingress port from the ingress ports, which an optical signal of a service is not allowed to pass through, in the wavelength selective switch at the transmit end, as the second port.

3. The method according to claim 1, wherein separately configuring the different wavelength cross connection for the acquired logic optical propagation paths comprises:

determining whether a wavelength cross connection has been configured for the logic optical propagation path;
when it is determined that a wavelength cross connection has been configured for the logic optical propagation path, keeping a current wavelength cross connection configuration unchanged;
when it is determined that no wavelength cross connection is configured for the logic optical propagation path,
acquiring an egress port of a wavelength selective switch at a receive end and an ingress port of a wavelength selective switch at a transmit end, wherein an optical propagation path with no wavelength cross connection configured passes through the egress port and the ingress port;
selecting a wavelength from currently unused wavelengths;
setting an optical switch state of the passed-through egress port of the wavelength selective switch at the receive end to allowing an optical signal with a wavelength being the selected wavelength to pass through; and
setting an optical switch state of the passed-through ingress port of the wavelength selective switch at the transmit end to allowing an optical signal with a wavelength being the selected wavelength to pass through.

4. The method according to claim 1, wherein separately configuring a different wavelength cross connection for the acquired logic optical propagation paths comprises:
determining that a wavelength cross connection has been configured for the logic optical propagation path;
acquiring an egress port of a wavelength selective switch at a receive end and an ingress port of a wavelength selective switch at a transmit end, wherein an optical propagation path with no wavelength cross connection configured passes through the egress port and the ingress port;
selecting a wavelength from currently unused wavelengths;
setting an optical switch state of the passed-through egress port of the wavelength selective switch at the receive end to allowing an optical signal with a wavelength being the selected wavelength to pass through; and
setting an optical switch state of the passed-through ingress port of the wavelength selective switch at the transmit end to allowing an optical signal with a wavelength being the selected wavelength to pass through.

5. An apparatus for acquiring an internal fiber connection relationship in a reconfigurable optical add/drop multiplexer, comprising:
an acquiring unit, configured to acquire logic optical propagation paths between an egress port of a wavelength selective switch at a receive end and an ingress port of a wavelength selective switch at a transmit end, wherein the logic optical propagation paths are virtual optical propagation paths along which an optical signal may pass through in a transmission process;
a configuration unit, configured to separately configure a different wavelength cross connection for the logic optical propagation paths acquired by the acquiring unit;
a light source connecting unit, configured to connect a communication light source to an ingress port of the wavelength selective switch at the receive end;

a collecting unit, configured to collect a wavelength of an optical signal on an egress port of the wavelength selective switch at the transmit end;

a determining unit, configured to determine, according to the wavelength of the optical signal collected by the collecting unit, a logic optical propagation path corresponding to the collected wavelength of the optical signal, wherein the determining unit is configured to determine a fiber connection relationship between the egress port of the wavelength selective switch at the receive end and the ingress port of the wavelength selective switch at the transmit end according to the logic optical propagation path corresponding to the collected wavelength of the optical signal; and a storage unit, configured to store the fiber connection relationship; and wherein the acquiring unit comprises:

a port determining module, configured to determine that egress ports of the wavelength selective switch at the receive end are a first group of ports, and determine that ingress ports of the wavelength selective switch at the transmit end are a second group of ports; and a path determining module, configured to determine that a path, which successively passes through the ingress port of the wavelength selective switch at the receive end, one port of the first group of ports, one port of the second group of ports, and the egress port of the wavelength selective switch at a sending end, is a logic optical propagation path between the wavelength selective switch at the receive end and the wavelength selective switch at the transmit end; and a configuration information acquiring module, configured to acquire configuration information of a current service wavelength cross connection;

wherein the port determining module is configured to determine, according to the configuration information of the current service wavelength cross connection acquired by the configuration information acquiring module, egress ports, which an optical signal of a service is not allowed to pass through, in the wavelength selective switch at the receive end, and ingress ports, which an optical signal of a service is not allowed to pass through, in the wavelength selective switch at the transmit end; and wherein the port selecting module is configured to select an egress port from the egress ports, which an optical signal of a service is not allowed to pass through, in the wavelength selective switch at the receive end, as a first port, and select an ingress port from the ingress ports, which an optical signal of a service is not allowed to pass through, in the wavelength selective switch at the transmit end, as a second port.

6. The apparatus according to claim 5, wherein the configuration unit comprises:

a judging module, configured to determine whether a wavelength cross connection has been configured for the logic optical propagation path;

a port acquiring module, configured to, when the judging module determines that no wavelength cross connection is configured for the logic optical propagation path, acquire an egress port of a wavelength selective switch at a receive end and an ingress port of a wavelength selective switch at a transmit end, wherein an optical propagation path with no wavelength cross connection configured passes through the egress port and the ingress port;

a wavelength selecting module, configured to select a wavelength from currently unused wavelengths; and a wavelength setting module, configured to set an optical switch state of the passed-through egress port of the wavelength selective switch at the receive end to allowing an optical signal with a wavelength being the wavelength selected by the wavelength selecting module to pass through, the wavelength setting module also configured to set an optical switch state of the passed-through ingress port of the wavelength selective switch at the transmit end to allowing an optical signal with a wavelength being the wavelength selected by the wavelength selecting module to pass through.

7. The apparatus according to claim 6, wherein the wavelength setting module is further configured to keep a current wavelength cross connection configuration unchanged when the judging module determines that a wavelength cross connection has been configured for the logic optical propagation path.

8. An apparatus for acquiring an internal fiber connection relationship in a reconfigurable optical add/drop multiplexer, the apparatus comprising:

a processor, configured to:
  acquire logic optical propagation paths between an egress port of a wavelength selective switch at a receive end and an ingress port of a wavelength selective switch at a transmit end;
  separately configure a different wavelength cross connection for the acquired logic optical propagation paths, wherein separately configuring the different wavelength cross connection for the acquired logic optical propagation paths comprises:
    for each acquired logic optical propagation path, determining whether a wavelength cross connection has been configured for the logic optical propagation path; and
    selecting a wavelength from unused wavelengths for an acquired logic optical propagation path;
  determine, according to a collected wavelength of an optical signal, a logic optical propagation path corresponding to the collected wavelength of the optical signal; and
  determine, from the logic optical propagation path corresponding to the collected wavelength of the optical signal, a fiber connection relationship between the egress port of the wavelength selective switch at the receive end and the ingress port of the wavelength selective switch at the transmit end;

a detector, configured to connect a communication light source to an ingress port of the wavelength selective switch at the receive end and collect a wavelength of an optical signal on an egress port of the wavelength selective switch at the transmit end; and a memory, configured to store the fiber connection relationship; and wherein the processor is further configured to acquire configuration information of a current service wavelength cross connection; determine, according to the configuration information of the current service wavelength cross connection, egress ports, which an optical signal of a service is not allowed to pass through, in the wavelength selective switch at the receive end, and ingress ports, which an optical signal of a service is not allowed to pass through, in the wavelength selective switch at the transmit end; select an egress port from the egress ports, which an optical signal of a service is not allowed to pass through, in the wavelength selective switch at the receive end, as a first port; and select an ingress port from the ingress ports, which an optical signal of a service is not allowed to pass through, in the wavelength selective switch at the transmit end, as a second port.

9. The apparatus according to claim 8, wherein the processor is further configured to determine that egress ports of the wavelength selective switch at the receive end are a first group of ports and that ingress ports of the wavelength selective switch at the transmit end are a second group of ports, and to determine that a path, which successively passes through the ingress port of the wavelength selective switch at the receive end, one port of the first group of ports, one port of the second group of ports, and the egress port of the wavelength selective switch at a sending end, is a logic optical propagation path between the wavelength selective switch at the receive end and the wavelength selective switch at the transmit end.

10. The apparatus according to claim 9, the memory is further configured to store the logic optical propagation path.

11. The apparatus according to claim 8, wherein the processor is further configured to acquire an egress port of a wavelength selective switch at a receive end and an ingress port of a wavelength selective switch at a transmit end when it is determined that no wavelength cross connection is configured for the logic optical propagation path, where an optical propagation path with no wavelength cross connection configured passes through the egress port and the ingress port, to set an optical switch state of the passed-through egress port of the wavelength selective switch at the receive end to allowing an optical signal with a wavelength being the selected wavelength to pass through, and to set an optical switch state of the passed-through ingress port of the wavelength selective switch at the transmit end to allowing an optical signal with a wavelength being the selected wavelength to pass through.

12. The apparatus according to claim 11, wherein the memory is further configured to store the currently unused wavelengths, the optical switch state of the currently passed-through egress port of the wavelength selective switch at the receive end, and the optical switch state of the currently passed-through ingress port of the wavelength selective switch at the transmit end.

13. The apparatus according to claim 11, the processor is further configured to keep a current wavelength cross connection configuration unchanged when it is determined that a wavelength cross connection has been configured for the logic optical propagation path.

14. The apparatus according to claim 13, wherein the memory is configured to store the current wavelength cross connection configuration.

* * * * *